United States Patent Office

3,216,789
CRYSTALLINE ZEOLITE L
Donald W. Breck, Tonawanda, and Nancy A. Acara, Kenmore, N.Y., assignors to Union Carbide Corporation, a corporation of New York
No Drawing. Filed Aug. 3, 1962, Ser. No. 214,479
18 Claims. (Cl. 23—113)

This application is a continuation-in-part of Serial No 122,398, filed July 7, 1961 (now abandoned), which itself is a continuation application of Serial No. 711,565, filed January 28, 1958 (also now abandoned).

This invention relates to a novel composition of matter and to a process for preparing and utilizing this novel material. More particularly, the invention is concerned with a novel, synthetic member of the zeolite family.

The term "zeolite," in general, refers to a group of naturally occurring, hydrated, metal aluminosilicates, many of which are crystalline in structure. The synthetic material of the invention has a composition similar to certain of the natural crystalline zeolites. Accordingly, the term "synthetic zeolite" is applied to the materials prepared by the process of the invention. There are, however, significant differences between the synthetic and natural materials. For convenience and distinguishability, the synthetic material of the invention will be referred to hereinafter as "zeolite L."

Crystalline zeolites structurally consist basically of an open, three-dimensional framework of $SiO_4$ and $AlO_4$ tetrahedra. The tetrahedra are cross-linked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, e.g., alkali metal or alkaline earth metal ions. This balance may be expressed by the formula $2Al/(TNa, 2K, 2Li, Ca, Ba, Sr,$ etc.$)=1$. Moreover, it has been found that one cation may be replaced for another by suitable exchange techniques. Consequently, crystalline zeolites are often employed as ion-exchange agents.

It is also known that the crystal structures of many zeolites exhibit interstices of molecular dimensions. The interstitial spaces are generally occupied by water of hydration. Under proper conditions, viz., after at least partial dehydration, these zeolites may be utilized as efficient adsorbents whereby adsorbate molecules are retained within the interstitial spaces. Access to these channels is had by way of orifices in the crystal lattice. These openings limit the size and shape of the molecules that can be adsorbed. A separation of mixtures of foreign molecules based upon molecular dimensions, wherein certain molecules are adsorbed by the zeolite while others are refused, is therefore possible. It is this characteristic property of many crystalline zeolites that has led to their designation as "molecular sieves." In addition to molecular size and shape, however, other factors may also influence the selective adsorption of certain foreign molecules by molecular sieves. Among these factors are: the polarizability and polarity of the adsorbate molecules; the degree of unsaturation of organic adsorbates; the size and polarizing power of the interstitial cation; the presence of adsorbate molecules in the interstitial spaces; and the degree of hydration of the zeolite.

A number of synthetic crystalline zeolites have been prepared. They are distinguishable from each other, and from the naturally occurring materials, on the basis of their composition, crystal structure and adsorption properties. A suitable method for distinguishing these compounds, for example, is by their X-ray powder diffraction patterns. The existence of a number of zeolites having similar but distinguishable properties advantageously permits the selection of a particular member having optimum properties for a particular use.

The present invention has as its prime object the provision of a novel, synthetic, crystalline zeolite of the molecular sieve type. Another object is to provide a novel, synthetic, crystalline zeolite having useful ion-exchange and adsorption properties. A further object is to provide a convenient and efficient process for preparing the novel material of the invention.

The composition of zeolite L may stoichiometrically be expressed in terms of moles of oxides. Thus, a general formula for zeolite L may be represented as follows:

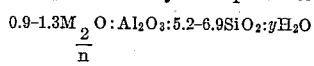
$$0.9\text{--}1.3 M_{\frac{2}{n}}O : Al_2O_3 : 5.2\text{--}6.9 SiO_2 : yH_2O$$

wherein "M" designates at least one exchangeable cation, as hereinbelow defined; "n" represents the valence of "M"; and "y" may be any value from 0 to about 9. It was described in our aforementioned parent applications Serial Nos. 711,565 and 122,398 that zeolite L has a general formula as follows:

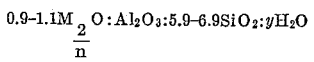
$$0.9\text{--}1.1 M_{\frac{2}{n}}O : Al_2O_3 : 5.9\text{--}6.9 SiO_2 : yH_2O$$

wherein "M" and "n" are as indicated above and "y" has any value between 0 and 7. As may be seen by comparing the new general formula with the previous formula, it has been further discovered that zeolite L has a broader range of $SiO_2$,

$$M_{\frac{2}{n}}O$$

and $H_2O$. Both of the above-identified applications are now abandoned.

Minor variations in the mole ratios of the oxides within the ranges indicated by the above formulae do not significantly change the crystal structure or physical properties of the zeolite. Likewise, the value of "y" is not necessarily an invariant for all samples of zeolite L. This is true because various exchangeable cations are of different size, and as no appreciable modification of the crystal lattice dimensions of the zeolite is effected by the exchange of these particular cations, more or less interstitial space should be available for the accommodation of water molecules. The value of "y" therefore depends upon the identity of the exchangeable cation and also upon the degree of dehydration of the zeolite.

The exchangeable cations contemplated by the present invention include mono-, di- and trivalent metal ions, particularly those of Groups I, II and III of the Periodic Table, as set forth in Webster's New Collegiate Dictionary, 1956 edition, page 626, such as barium, calcium, cerium, lithium, magnesium, potassium, sodium, strontium, zinc ions etc. and the like, and other cations, for example, hydrogen and ammonium ions, which with zeolite L behave like the metal ions mentioned above in that they may be replaced for other exchangeable cations without causing a substantial alteration of the basic crystal structure of the zeolite. Of the exchangeable cations, mono- and divalent cations are especially satisfactory to the invention since they ordinarily may more easily be included within the cavities of the zeolite crystal.

Although there are a number of cations that may be present in zeolite L, it is preferred to synthesize the potassium form of the zeolite, i.e., the form in which the exchangeable cations present are substantially all potassium ions. The reactants accordingly employed are readily available and generally water soluble. The exchangeable cations present in the zeolite may then conveniently be replaced by other exchangeable cations, as will be shown below, thereby yielding isomorphic forms of zeolite L.

In a embodiment of the present invention, the potassium form of zeolite L is prepared by suitably heating an aqueous metal aluminosilicate mixture whose composition, expressed in terms of mole ratios of oxides, falls with the range:

$K_2O/(K_2O+Na_2O)$ _____ From about 0.33 to about 1
$(K_2O+Na_2O)/SiO_2$ _____ From about 0.35 to about 0.5
$SiO_2/Al_2O_3$ _____ From about 10 to about 28
$H_2O/(K_2O+Na_2O)$ _____ From about 15 to about 41

The desired product is thereby crystallized out relatively free from zeolites of dissimilar crystal structure.

In our previous applications referred to above, we indicated that the potassium form of zeolite L could be prepared from an aqueous metal aluminosilicate mixture whose composition falls in the range:

$K_2O/(K_2O+Na_2O)$ _____ From about 0.33 to about 1
$(K_2O+Na_2O)/SiO_2$ _____ From about 0.4 to about 0.5
$SiO_2/Al_2O_3$ _____ From about 15 to about 28
$H_2O/(K_2O+Na_2O)$ _____ From about 15 to about 41

Thus, it may be seen that zeolite L may be produced from lower $(K_2O+Na_2O)/SiO_2$ and $SiO_2/Al_2O_3$ ranges than previously disclosed. These lower ranges yield a pure to relatively pure zeolite L product.

The potassium form of zeolite L may also be prepared along with other zeolitic compounds by employing a reaction mixture whose composition, expressed in terms of mole ratios of oxides, falls within the following range:

$K_2O/(K_2O+Na_2O)$ _____ From about 0.26 to about 1
$(K_2O+Na_2O)/SiO_2$ _____ From about 0.34 to about 0.5
$SiO_2/Al_2O_3$ _____ From about 15 to about 28
$H_2O/(K_2O+Na_2O)$ _____ From about 15 to about 51

It is to be noted that the presence of sodium in the reaction mixture is not critical to the present invention. However, it has been found that the potassium form of zeolite L is more readily obtained from reaction mixtures in which sodium is incorporated within the range indicated above.

When the zeolite is prepared from reaction mixtures containing sodium, sodium ions are generally also included within the product as part of the exchangeable cations together with the potassium ions. The product obtained from the above ranges has a composition, expressed in terms of moles of oxides, corresponding to the formula:

$$0.9-1.3[(1-x)K_2O, xNa_2O]:Al_2O_3:5.2-6.9SiO_2:yH_2O$$

wherein "$x$" may be any value from 0 to about 0.75 and "$y$" may be any value from 0 to about 9.

In making zeolite L, representative reactants are activated alumina, gamma alumina, alumina trihydrate and sodium aluminate as a source of alumina. Silica may be obtained from sodium or potassium silicate, silica gels, silicic acid, aqueous colloidal silica sols and reactive amorphous solid silicas. The preparation of typical silica sols which are suitable for use in the process of the present invention are described in U.S. Patent No. 2,574,902 and U.S. Patent No. 2,597,872. Typical of the group of reactive amorphous solid silicas, preferably having an ultimate particle size of less than 1 micron, are such materials as fume silicas, chemically precipitated and precipitated silica sols, and including silicas such as those known by such trade names as "Santocel," "Cab-O-Sil," "Hi-Sil," and "Quso." Finely divided "Vycor" glass powder may also be used. Potassium and sodium hydroxide may supply the metal cation and assist in controlling pH.

In making zeolite L, the usual method comprises dissolving potassium or sodium aluminate and alkali, viz., potassium or sodium hydroxide, in water. This solution is admixed with a water solution of sodium silicate, or preferably with a water-silicate mixture derived at least in part from an aqueous colloidal silica sol. The resultant reaction mixture is placed in a container made, for example, of metal or glass. The container should be closed to prevent loss of water. The reaction mixture is then stirred to insure homogeneity.

For best results, the crystallization procedure is carried out at a temperature of approximately 100° C. The zeolite may, however, be satisfactorily prepared at temperatures of from about 100° C. to about 120° C., and even up to about 150° C., the pressure being atmospheric or at least that corresponding to the vapor pressure of water in equilibrium with the mixture of reactants at the higher temperature. Any suitable heating apparatus, e.g., an oven, sand bath, oil bath or jacketed autoclave, may be used. Heating is continued until the desired crystalline zeolite product is formed. The zeolite crystals are then filtered off and washed to separate them from the reactant mother liquor. The zeolite crystals should be washed, preferably with distilled water, until the effluent wash water, in equilibrium with the product, has a pH of between about 9 and 12. As the zeolite crystals are washed, the exchangeable cation of the zeolite may be partially removed and is believed to be replaced by hydrogen cations. If the washing is discontinued when the pH of the effluent wash water is between about 10 and 11, the $(K_2O+Na_2O)/Al_2O_3$ molar ratio of the crystalline product will be approximately 1.0. Excessive washing will result in a somewhat lower value for this ratio, while insufficient washing will leave a slight excess of exchangeable cations associated with the product. Thereafter, the zeolite crystals may be dried, conveniently in a vented oven.

Typical of the manner in which the potassium form of zeolite L may be prepared are the following examples.

EXAMPLE 1

A solution of potassium aluminate was prepared by dissolving 5.6 grams of hydrated alumina, containing 0.032 mole of $Al_2O_3$ and 0.095 mole of water, in a solution containing 28.7 grams of potassium hydroxide in 17.1 ml. of water. The solution was then added to 130 grams of an aqueous colloidal silica sol containing 29.5 percent silica by weight. The resultant reaction mixture, having a composition, expressed in terms of moles of oxides, as follows:

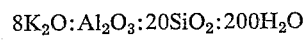
$8K_2O:Al_2O_3:20SiO_2:200H_2O$ was stirred until homogeneous. Crystallization of the desired zeolite product was carried out by heating the reaction mixture in a sealed glass jar at a temperature of 100° C. for approximately 169 hours. The crystalline product which formed had thereupon settled to the bottom of the jar, and the reactant mother liquor was clear. The crystalline product was then filtered, washed with water until the effluent wash water had a pH of about 10.5 to 11.0, and dried. X-ray analysis of the produce revealed a powder diffraction pattern characteristic of zeolite L as indicated below in Tables A and B.

EXAMPLE 2

5.00 grams of sodium aluminate, containing 0.024 mole of $Na_2O$ and 0.0215 mole of $Al_2O_3$, were dissolved in a solution containing 7.32 grams of sodium hydroxide and 13.70 grams of potassium hydroxide in 84.5 ml. of water. This solution was then added to 124.2 grams of an aqueous colloidal silica sol containing 29.5 percent silica by weight. The resultant reaction mixture, having a composition, expressed in terms of moles of oxides, as follows:

$5.7K_2O:5.4Na_2O:Al_2O_3:28SiO_2:452H_2O$ was stirred until homogeneous. Crystallization of the desired zeolite product was carried out by heating the reaction mixture in a sealed glass jar at a temperature of 100° C. for approximately 64 hours. The crystalline product which formed had thereupon settled to tthe bottom of the jar, and the reactant mother liquor was clear. The crystalline product was then filtered, washed with water until the effluent wash water had a pH of about 10.5 to 11.0, and dried. Chemical analysis showed the product to be a zeolite having a composition, expressed in terms of moles of oxides, corresponding to the formula:

$$1.01K_2O:0.9Na_2O:Al_2O_3:6.2SiO_2:5.0H_2O$$

X-ray analysis of the product revealed a powder diffraction pattern characteristic of zeolite L as indicated below in Tables A and B.

EXAMPLE 3

The preparation of the potassium form of zeolite L was repeated in a manner similar to that described above in Example 2, employing, however, a tenfold increase in the weights of reactants. Chemical analysis showed the product to be a zeolite having a composition, expressed in terms of moles of oxides, corresponding to the formula:

$$0.93K_2O:0.13Na_2O:Al_2O_3:5.95SiO_2:4.6H_2O$$

X-ray analysis of the product revealed a powder diffraction pattern characteristic of zeolite L as indicated below in Tables A and B.

EXAMPLE 4

8.46 grams of hydrated alumina containing 65.0 wt.-percent $Al_2O_3$ were dissolved with heating in a solution containing 19.26 grams of KOH (74.0 wt.-percent $K_2O$) and 25 cc. of water. This solution was then added to 3.02 grams of NaOH (77.5 wt.-percent $Na_2O$) dissolved in 103 cc. of water. To this solution, 33.3 grams of "Cab-O-Sil," a reactive amorphous solid silica containing 96 wt.-percent $SiO_2$, was added and mixed until a homogeneous mixture was obtained. The resultant reaction mixture had a composition, expressed in terms of moles of oxides, as follows:

$$0.70Na_2O:2.80K_2O:Al_2O_3:10SiO_2:140H_2O$$

Crystallization of the desired zeolite product was carried out by heating the reaction mixture at 150° C. in a closed stainless steel container for 45.5 hours. At the end of the reaction period, the settled solids were separated from the supernatant liquor by filtration, washed to a pH of about 9, and dried at 100° C. The crystallization product was found to be essentially pure zeolite L by X-ray powder diffraction analysis and 80% zeolite L by adsorption evaluation. Chemical analysis showed the product to be a zeolite having a composition, expressed in terms of moles of oxides corresponding to the formula:

$$0.03Na_2O:1.01K_2O:Al_2O_3:5.71SiO_2:4.88H_2O$$

X-ray analysis of the product revealed a powder diffraction pattern characteristic of zeolite L as indicated below in Tables A and B.

EXAMPLE 5

6.35 grams of hydrated alumina containing 65.0 wt.-percent $Al_2O_3$ were dissolved with heating in a solution containing 10.83 grams of KOH (74.0 wt.-percent $K_2O$) and 20 cc. of water. This solution was then added to 4.50 grams NaOH (77.5 wt.-percent $Na_2O$) dissolved in 76.5 cc. of water. To this solution, 25.0 grams of "Cab-O-Sil," a reactive amorphous solid silica containing 96 wt.-percent $SiO_2$, was added and mixed until a homogeneous mixture was obtained. The resultant reaction mixture had a composition, expressed in terms of moles of oxides as follows:

$$1.40Na_2O:2.1K_2O:Al_2O_3:10SiO_2:140H_2O$$

Crystallization of the desired zeolite product was carried out by heating the reaction mixture at 100° C. in a sealed glass container for 97 hours. At the end of the reaction period, the settled solids were separated from the supernatant liquor by filtration, washed to a pH of about 9, and dried at 100° C. The crystalline product was found to be 95% zeolite L by X-ray powder diffraction analysis. Chemical analysis showed the product to be a zeolite having a composition expressed in terms of moles of oxides, corresponding to the formula:

$$0.04Na_2O:0.98K_2O:Al_2O_3:5.47SiO_2:4.55H_2O$$

X-ray analysis of the product revealed a powder diffraction pattern characteristic of zeolite L as indicated below in Tables A and B.

EXAMPLE 6

Using a procedure identical to that of Example 5, a reaction mixture having a composition, expressed in terms of moles of oxides, as follows was prepared:

$$5.35Na_2O:5.65K_2O:Al_2O_3:28SiO_2:282H_2O$$

The reactive silica in this example was, however, provided by an aqueous colloidal silica sol. The product of the reaction, which was conducted for 119 hours at 150° C. was found to be 99% zeolite L by X-ray analysis. Chemical analysis of the product revealed the composition to be as follows:

$$0.23Na_2O:1.06K_2O:Al_2O_3:6.01SiO_2:5.89H_2O$$

X-ray analysis of the product revealed a powder diffraction pattern characteristic of zeolite L as indicated below in Tables A and B.

The replacement of the exchangeable cations present in zeolite L at least in part by other cations may be accomplished by conventional ion-exchange techniques. A preferred, continuous method is to pack zeolite L into a series of vertical columns with suitable supports at the bottom; successively pass through the beds, at room temperature, a water solution of a soluble salt of the cation to be introduced into the zeolite; and change the flow from the first bed to the second as the zeolite in the first bed becomes ion-exchanged to the extent desired. To obtain sodium exchange, for example, a water solution of sodium chloride or dilute sodium hydroxide is suitable; for barium, calcium, cerium, lithium, magnesium, strontium, zinc, ammonium exchange, and the like, water solutions of the chlorides, sulfates or nitrates of these cations may be utilized. While it is more convenient to use water-soluble compounds of the exchangeable cations, other solutions containing the desired cations may also be employed. Moreover, particularly good results may be obtained by the utilization of an exchanging solution having a pH of between about 5 and 12.

In a typical exchange, 4.0 grams of the potassium form of zeolite L were admixed with 50 ml. of a 1 molar aqueous cerous nitrate solution. The mixture was warmed with gentle agitation for about 30 minutes and the zeolite crystals then separated from the exchanging solution by filtration. The exchange process was repeated four times. The zeolite crystals were subsequently refiltered, washed with distilled water and dried. Analysis of the product indicated that approximately 28 percent of the exchangeable cations originally present in the zeolite had been replaced by cerous ions.

In another exchange, 66.5 grams of the potassium form of zeolite L were admixed with an aqueous solution containing 188 grams of calcium chloride in 1300 ml. of water. The mixture was warmed with gentle agitation for about 30 minutes and the zeolite crystals then separated from the exchanging solution by filtration. The exchange process was repeated twice. The zeolite crystals were subsequently refiltered, washed with distilled water and dried. Analysis of the product indicated that approximately 71.3 percent of the exchangeable cations originally present in the zeolite had been replaced by calcium ions.

In other exchanges conducted in a similar manner, 9.9 grams of the potassium form of zeolite L were treated with the following solutions: (a) 183.2 grams of barium chloride dihydrate in 1000 ml. of water, resulting in the replacement of approximately 73.2 percent of the exchangeable cations in the zeolite by barium ions; (b) 96.0 grams of lithium sulfate monohydrate in 1000 ml. of water, resulting in the replacement of approximately 47.6 percent of the exchangeable cations in the zeolite by lithium ions; (c) 152.5 grams of magnesium chloride hexahydrate in 1000 ml. of water, resulting in the replacement of approximately 39.1 percent of the exchangeable cations in the zeolite by magnesium ions; (d) 87.7 grams of sodium chloride in 1000 ml. of water, resulting in the replacement of approximately 41.4 percent of the exchangeable cations in the zeolite by sodium ions; (e) 200 grams of strontium chloride hexahydrate in 1000 ml. of water, resulting in the replacement of approximately 48.3 percent of the exchanged cations in the zeolite by strontium ions; and (f) 223.1 grams of zinc nitrate hexahydrate in 1000 ml. of water, resulting in the replacement of approximately 22.8 percent of the exchangeable cations in the zeolite by zinc ions.

In addition to composition, zeolite L may be identified and distinguished from other zeolites and other crystalline substances by its X-ray powder diffraction pattern, the data for which are set forth below in Tables A and B. In obtaining the X-ray powder diffraction patterns standard techniques were employed. The radiation was the K-alpha doublet of copper, and a Geiger counter spectrometer with a strip chart pen recorder was used. The peak heights, I, and the positions as a function of $2\theta$, where $\theta$ is the Bragg angle, were read from the spectrometer chart. From these, the relative intensities, $100I/I_0$, where $I_0$ is the intensity of the strongest line or peak, and $d$ (A.) observed, in the interplanar spacing in Angstrom units, corresponding to the recorded lines were determined.

X-ray powder diffraction data for samples of the potassium from zeolite L prepared from a potassium aluminosilicate reaction mixture ($K_2L$) and from a potassium-sodium aluminosilicate mixture (K–NaL) are given below in Table A. Also included in Table A are X-ray data for isomorphic forms of zeolite L in which varying proportions of the exchangeable cations originally present in the zeolite had been replaced by other exchangeable cations, viz., a 73.2 percent barium exchanged zeolite L (BaL), a 71.3 percent calcium exchanged zeolite L (CaL), a 28 percent cerium exchanged zeolite L ($Ce_2L_3$), a 39.1 percent magnesium exchanged zeolite L (MgL), a 41.4 percent sodium exchanged zeolite L ($Na_2L$), a 48.3 percent strontium exchanged zeolite L (SrL) and a 22.8 percent zinc exchanged zeolite L (ZnL).

i.e., the arrangement of the $AlO_4$ and $SiO_4$ tetrahedra, are essentially identical in all forms of zeolite L. The appearance of a few minor X-ray lines and the disappearance of others from one cation form of zeolite L to another, as well as slight changes in positions and intensities of some of the X-ray lines, may be attributed to the different sizes and numbers of exchangeable cations present in the various forms of the zeolite.

The more significant $d$ (A) values, i.e., interplanar spacings, for zeolite L are given below in Table B.

Table B 16.1 ±0.3
7.52±0.04
6.00±0.04
4.57±0.04
4.35±0.04
3.91±0.02
3.47±0.02
3.28±0.02
3.17±0.01
3.07±0.01
2.91±0.01
2.65±0.01
2.46±0.01
2.42±0.01
2.19±0.01

Thus, zeolite L may be defined as a synthetic, crystalline aluminosilicate having an X-ray powder diffraction pattern characterized by at least those interplanar spacing values as set forth in Table B.

Occasionally, additional lines not belonging to the pattern for zeolite L appear in a pattern along with the X-ray lines characteristic of the zeolite. This is an indication that one or more additional crystalline materials are mixed with zeolite L in the sample being tested. The particular X-ray technique and/or apparatus employed, the humidity, the temperature, the orientation of the powder crystals and other variables, all of which are well known and understood to those skilled in the art of X-ray crystallography or diffraction, may also cause some variations in the positions and intensities of the X-ray lines. Thus, the X-ray data given herein to identify zeolite L are not to exclude those materials which, due to some variable mentioned above or otherwise known to those skilled in the art fail to show all of the tabulated X-ray lines, or show a few extra ones that are permissible to the Table A

| $2\theta$ | $d$ (A.) | $100I/I_0$ | | | | | | | | |
|---|---|---|---|---|---|---|---|---|---|---|
| | | $K_2L$ | K–NaL | BaL | CaL | $Ce_2L_3$ | MgL | $Na_2L$ | SrL | ZnL |
| 5.6 | 15.8 | 100 | 100 | 100 | 100 | 100 | 100 | 100 | 100 | 100 |
| 11.2 | 7.89 | 14 | 6 | 38 | 10 | 38 | 12 | 9 | 12 | 15 |
| 11.8 | 7.49 | 15 | 14 | 62 | 31 | 94 | 24 | 25 | 41 | 32 |
| 14.8 | 5.98 | 25 | 16 | 56 | 33 | 94 | 29 | 21 | 44 | 38 |
| 15.4 | 5.75 | 11 | 6 | 31 | 18 | ------ | 16 | 14 | 12 | 32 |
| 19.4 | 4.57 | 32 | 30 | 69 | 37 | 75 | 33 | 34 | 32 | 65 |
| 20.2 | 4.39 | 13 | 13 | 38 | 16 | 63 | 12 | 13 | 32 | 18 |
| 20.5 | 4.33 | 13 | 19 | 38 | 29 | 69 | 22 | 23 | 50 | 35 |
| 22.7 | 3.91 | 30 | 35 | 56 | 33 | 81 | 39 | 34 | 63 | 47 |
| 23.4 | 3.78 | 13 | 13 | 13 | 12 | 38 | 14 | 12 | 16 | 18 |
| 24.3 | 3.66 | 19 | 18 | 50 | 22 | 56 | 20 | 16 | 32 | 29 |
| 25.6 | 3.48 | 23 | 21 | 62 | 22 | 50 | 24 | 25 | 41 | 38 |
| 27.3 | 3.26 | 14 | 23 | 25 | 22 | 25 | 20 | 21 | 28 | 38 |
| 28.1 | 3.17 | 34 | 48 | 100 | 47 | 88 | 51 | 46 | 56 | 56 |
| 29.1 | 3.07 | 22 | 27 | 50 | 22 | 63 | 29 | 29 | 41 | 38 |
| 29.6 | 3.02 | 15 | 14 | 38 | 10 | 25 | 12 | 11 | 31 | 12 |
| 30.7 | 2.91 | 23 | 27 | 62 | 31 | 81 | 29 | 29 | 56 | 44 |
| 33.8 | 2.65 | 19 | 18 | 44 | 16 | 69 | 22 | 21 | 31 | 32 |
| 34.2 | 2.62 | 8 | 16 | 31 | 8 | 38 | 14 | 11 | 12 | 12 |
| 35.5 | 2.53 | 8 | 6 | 25 | 4 | 38 | 6 | 5 | 12 | 6 |
| 36.6 | 2.45 | 9 | 10 | 19 | 6 | 44 | 6 | 9 | 22 | 12 |
| 37.1 | 2.42 | 11 | 10 | 25 | 4 | 25 | 10 | 7 | 22 | 9 |
| 41.2 | 2.19 | 11 | 10 | 25 | 10 | 56 | 12 | 11 | 28 | 12 |

The positions and relative intensities of the X-ray lines are only slightly different for the various cation forms of zeolite L. The patterns show substantially all of the same lines, and all meet the requirements of a unit cell of approximately the same size. The spatial arrangement of silicon, oxygen, and aluminum atoms, crystal system of the zeolite, or show a shift in position or slight change in intensity of some of the X-ray lines.

For satisfactory use as an absorbent, zeolite L should be activated by at least partial dehydration. Such activation may be performed, for example, by heating the zeolite to temperatures of approximately 350° C. under atmospheric or reduced pressure, or by maintaining the zeolite at room temperature under vacuum. Unlike common absorbents such as charcoal and silica gel which show adsorption selectivities based primarily on the boiling point or critical temperature of the adsorbate, activated zeolite L exhibits a selectivity based on the size, shape, degree of unsaturation, polarity and polarizability of the absorbate molecule. Among those adsorbate molecules whose size and shape are such to permit adsorption by zeolite L, a strong perference is exhibited toward those that are polar, polarizable and unsaturated. This high degree of selectivity shown by zeolite L for polar, polarizable, and unsaturated molecules renders the zeolite most useful in the separation of polar from less polar or non-polar molecules, polarizable from less or non-polarizable molecules and unsaturated from less unsaturated or saturated molecules.

It is to be noted that the rejection characteristics of zeolite L are as important as the adsorption characteristics. The interstitial channels of the zeolite are such that at their narrowest points molecules with critical dimensions greater than that of n-tripropylamine will not readily enter into the channels. The term "critical dimension" as employed herein may be defined as the maximum dimension of the minimum projected cross-section of the adsorbate molecule. The term may also be defined as the diameter of the smallest cylinder which will accommodate a model of the absorbate molecule using the best available values of bond distances, bond angles and Van der Waal's radii. Thus, molecules having critical dimensions greater than that of n-tripropylamine (approximately 9.1 Angstrom units) will be rejected by zeolite L, while those having smaller critical dimensions will be adsorbed.

Another property of zeolite L which contributes to its usefulness is that of adsorbing relatively large quantities of adsorbate at either very low adsorbate pressures or concentrations. The novel material of this invention may therefore be utilized as a selective adsorbent in numerous gas or liquid separation processes wherein adsorbents generally are not employed. The use of zeolite L also permits more efficient and more economical operation of numerous other processes now employing other adsorbents. The zeolite may, for example, be used in the removal of absorbable impurities from gas and liquid mixtures, or in the recovery of minor components of such mixtures.

Samples of the potassium form of zeolite L which had been activated by dehydration at a temperature of approximately 350° C., under vacuum, were tested to determine their adsorption properties. The results obtained are set forth below in Table C. In addition, samples of isomorphic, ion-exchanged forms of zeolite L, viz., of a 44 percent calcium exchanged zeolite L (CaL), a 53 percent sodium exchanged zeolite L (Na₂L), a 39 percent magnesium exchanged zeolite L (MgL), a 25 percent zinc exchanged zeolite L (ZnL) and a 73 percent barium exchanged zeolite L (BaL), were similarly activated and tested and the results tabulated below in Table D. The adsoprtion properties of the zeolite samples were measured in a McBain adsorption system. The samples were placed in light aluminum buckets suspended from quartz springs. They were activated in situ and the gas or vapor under test was then admitted to the system. The gain in weight of the adsorbent was measured by the spring extensions as read by a cathetometer. In Tables C and D, the pressure given for each adsorption is the pressure of the adsorbate. The term "Weight Percent Adsorbed" refers to the percentage increase in the weight of the adsorbent.

Table C

| Adsorbate | Temperature (° C.) | Pressure (mm. Hg) | Weight Percent Adsorbed |
|---|---|---|---|
| $H_2O$ | 25 | 0.1 | 6.0 |
|  |  | 4.5 | 12.6 |
|  |  | 20 | 20.0 |
| $CO_2$ | 100 | 20 | 7.7 |
|  | 25 | 10 | 1.9 |
|  |  | 100 | 6.9 |
|  |  | 700 | 10.9 |
| $O_2$ | −196 | 0.10 | 6.0 |
|  |  | 20 | 14.6 |
|  |  | 120 | 20.8 |
| Argon | −196 | 0.1 | 3.7 |
|  |  | 1 | 7.8 |
|  |  | 180 | 20.4 |
| Benzene | 25 | 27 | 12.3 |
|  |  | 80 | 17.7 |
| Thiophene | 25 | 20 | 14.3 |
|  |  | 72 | 18.8 |
| Krypton | −183 | 0.1 | 9.6 |
|  |  | 1 | 20.0 |
|  |  | 18 | 36.5 |
| m-Xylene | 25 | 1.6 | 10.1 |
|  |  | 8 | 16.9 |
| p-Xylene | 25 | 2.2 | 10.4 |
|  |  | 7 | 18.6 |
| Butene-1 | 25 | 3 | 4.7 |
|  |  | 100 | 7.4 |
|  |  | 700 | 9.2 |
| iso-Butane | 25 | 10 | 3.3 |
|  |  | 100 | 5.0 |
|  |  | 700 | 7.2 |
| $NH_3$ | 25 | 10 | 4.2 |
|  |  | 100 | 6.8 |
|  |  | 700 | 8.0 |
| $SO_2$ | 25 | 10 | 15.4 |
|  |  | 100 | 18.1 |
|  |  | 700 | 23.2 |
| Propane | 25 | 10 | 1.6 |
|  |  | 100 | 3.4 |
|  |  | 700 | 5.1 |
| Propylene | 25 | 10 | 4.2 |
|  |  | 100 | 5.6 |
|  |  | 700 | 7.2 |
| $N_2$ | −78 | 700 | 3.6 |
|  | −196 | 1 | 9.7 |
|  |  | 100 | 13.5 |
|  |  | 700 | 17.9 |
| n-Pentane | 25 | 10 | 5.7 |
|  |  | 100 | 9.5 |
|  |  | 400 | 12.4 |
| Cyclohexane | 25 | 1 | 5.5 |
|  |  | 10 | 8.6 |
|  |  | 92 | 18.1 |
| $(C_2F_5)_2NC_3F_7$ | 25 | 0.2 | 13 |
| $(C^6H_7)_3N$ | 25 | 3 | 10.2 |
| $(C_4F_9)_3$ | 25 | 0.07 | 2.5 |

Table D [1]

| Adsorbate | Temp. (° C.) | Pressure (mm. Hg) | Weight Percent Adsorbed By— ||||| 
|---|---|---|---|---|---|---|---|
|  |  |  | CaL | Na₂L | MgL | ZnL | BaL |
| $H_2O$ | 25 | 20 | 16.0 | 17.5 | 16.0 | 13.3 | 14.3 |
| $NH_3$ | 25 | 700 | 9.5 |  |  |  |  |
| $CO_2$ | 25 | 700 | 9.7 |  |  |  |  |
| $O_2$ | −183 | 700 |  |  | 13.1 | 9.5 | 11.8 |
| Argon | −196 | 180 | 26.2 |  |  |  |  |
| Argon | −183 | 700 |  |  | 13.6 | 8.0 | 12.6 |
| Benzene | 25 | 80 | 19.0 | 22.4 | 8.2 | 4.1 | 7.0 |
| Thiophene | 25 | 72 | 20.7 |  | 10.2 | 9.5 | 8.1 |
| Krypton | −183 | 18 | 43.8 | 47.7 |  |  |  |
| m-Xylene | 25 | 8 | 17.5 | 21.1 |  |  |  |
| p-Xylene | 25 | 7 | 18.3 | 22.3 |  |  |  |
| Butene-1 | 25 | 700 | 19.0 |  |  |  |  |
| Propane | 25 | 700 | 5.1 |  |  |  |  |
| Propylene | 25 | 700 | 8.0 |  |  |  |  |
| Isobutane | 25 | 700 | 7.6 |  |  |  |  |

[1] The blanks indicated by a dash in the table signify that the particular absorption te was not made.

The tabulated adsorption data show that water is more strongly adsorbed than any other material at comparable temperatures and pressures and illustrates a major use of zeolite L, i.e., the removal of water from mixtures containing water. An example of the use to be made of this property of strong adsorption at low pressures is the drying of an air stream that contains only small amounts of water initially. For instance, with air containing water at a temperature of 25° C. and a partial pressure of 0.1 millimeter of mercury, the potassium form of zeolite L adsorbs approximately 6 percent by weight of water. Under similar conditions, silica gel adsorbs only about 1 percent by weight of water. Similarly, this property of strong adsorption at low pressures may be utilized in the recovery of traces of ethylene, acetylene, propylene, butene and other gases from by-product or waste gas streams, or in the operation of adsorption processes at higher temperatures than are normally used with common adsorbents.

The greater affinity of zeolite L for adsorbate molecules possessing a greater degree of polarity, polarizability and unsaturation may also be seen from the tabulated adsorption data. For example, the data illustrate the adsorptive selectivity of zeolite L under similar conditions of temperature and pressure for unsaturated aliphatic compounds such as propylene and butene as compared with the corresponding saturated compounds propane and butane, and for unsaturated aromatic hydrocarbon such as xylene, as compared with saturated cylic hydrocarbons such as cyclohexane. The data further illustrate that organic sulfur compounds, generally more polar or polarizable than their hydrocarbon counterparts, are more strongly adsorbed by zeolite L than are their hydrocarbon counterparts. For instance, unde similar conditions of temperature and pressure zeolite L evidences a greater affinity for thiophene than for benzene.

As demonstrated by Table D, the selectivity of zeolite L for a given adsorbate molecule is altered somewhat by ion-exchange. Thus, for a particular adsorbate, one of the many cation forms of zeolite L, for example, a sodium exchanged zeolite L, may be a better adsorbent than other cation forms of the zeolite. Furthermore, the relative selectivity between the ion-exchanged forms of zeolite L may change with the temperature or with the pressure at which adsorptions are made.

Zeolite L may be used as an adsorbent for the purposes indicated above in any suitable form. For example, a column of powdered crystalline material may give excellent results as may a pelleted form obtained by pressing into pellets a mixture of the zeolite and a suitable bonding agent such as clay.

What is claimed is:

1. A synthetic, crystalline potassium-containing aluminosilicate zeolite having atoms arranged in a unit cell in such a manner that the X-ray powder diffraction pattern of the zeolite is essentially the same as that shown in Table B.

2. A synthetic, crystalline zeolite having a composition, expressed in terms of moles of oxides, as follows:

$$0.9\text{-}1.3 \frac{M_2}{n} O : Al_2O_3 : 5.2\text{-}6.9 SiO_2 : yH_2O$$

wherein "M" represents at least one exchangeable cation, "n" represents the valence of "M" and "y" is any value from 0 to about 9, said synthetic, crystalline zeolite having an X-ray powder diffraction pattern essentially the same as that shown in Table B.

3. A synthetic, crystalline zeolite having a composition, expressed in terms of moles of oxides, as follows:

$$0.9\text{-}1.3 \frac{M_2}{n} O : Al_2O_3 : 5.2\text{-}6.9 SiO_2 : yH_2O$$

wherein "M" represents at least one exchangeable cation selected from the group consisting of metal ions of Groups I, II and III of the Periodic Table, hydrogen ions and ammonium ions, "n" represents the valence of "M" and "y" is any value from 0 to about 9, said synthetic, crystalline zeolite having an X-ray powder diffraction pattern essentially the same as that shown in Table B.

4. A synthetic, crystalline zeolite having a composition, expressed in terms of moles of oxides, as follows:

$$0.9\text{-}1.3 \frac{M_2}{n} O : Al_2O_3 : 5.2\text{-}6.9 SiO_2 : yH_2O$$

wherein "M" represents at least one exchangeable cation selected from the group consisting of metal ions of Groups I, II and III of the Periodic Table, hydrogen ions and ammonium ions, "n" represents the valence of "M" and "y" is any value from 0 to about 9, said synthetic, crystalline zeolite having an X-ray powder diffraction pattern essentially as shown in the following table

| d (A.) |
|---|
| 15.8 |
| 7.89 |
| 7.49 |
| 5.98 |
| 5.75 |
| 4.57 |
| 4.39 |
| 4.33 |
| 3.91 |
| 3.78 |
| 3.66 |
| 3.48 |
| 3.26 |
| 3.17 |
| 3.07 |
| 3.02 |
| 2.91 |
| 2.65 |
| 2.62 |
| 2.53 |
| 2.45 |
| 2.42 |
| 2.19 |

5. A synthetic, crystalline zeolite according to claim 4, wherein at least a substantial portion of the exchangeable cations are potassium ions and the X-ray powder diffraction pattern is essentially as shown in the following table

| d (A.): | K₂L |
|---|---|
| 15.8 | 100 |
| 7.89 | 14 |
| 7.49 | 15 |
| 5.98 | 25 |
| 5.75 | 11 |
| 4.57 | 32 |
| 4.39 | 13 |
| 4.33 | 13 |
| 3.91 | 30 |
| 3.78 | 13 |
| 3.66 | 19 |
| 3.48 | 23 |
| 3.26 | 14 |
| 3.17 | 34 |
| 3.07 | 22 |
| 3.02 | 15 |
| 2.91 | 23 |
| 2.65 | 19 |
| 2.62 | 8 |
| 2.53 | 8 |
| 2.45 | 9 |
| 2.42 | 11 |
| 2.19 | 11 |

6. A synthetic, crystalline zeolite according to claim 4, wherein at least a substantial portion of the exchangeable cations are sodium ions and the X-ray powder diffraction pattern is essentially as shown in the following table

| d (Å.): | Na₂L |
|---|---|
| 15.8 | 100 |
| 7.89 | 9 |
| 7.49 | 25 |
| 5.98 | 21 |
| 5.75 | 14 |
| 4.57 | 34 |
| 4.39 | 13 |
| 4.33 | 23 |
| 3.91 | 34 |
| 3.78 | 12 |
| 3.66 | 16 |
| 3.48 | 25 |
| 3.26 | 21 |
| 3.17 | 46 |
| 3.07 | 29 |
| 3.02 | 11 |
| 2.91 | 29 |
| 2.65 | 21 |
| 2.62 | 11 |
| 2.53 | 5 |
| 2.45 | 9 |
| 2.42 | 7 |
| 2.19 | 1 |

7. A synthetic, crystalline zeolite according to claim 4, wherein at least a substantial portion of the exchangeable cations are lithium ions.

8. A synthetic, crystalline zeolite according to claim 3, wherein at least a substantial portion of the exchangeable cations are barium ions and the X-ray powder diffraction pattern is essentially as shown in the following table

| d (Å.): | BaL |
|---|---|
| 15.8 | 100 |
| 7.89 | 38 |
| 7.49 | 62 |
| 5.98 | 56 |
| 5.75 | 31 |
| 4.57 | 69 |
| 4.39 | 38 |
| 4.33 | 38 |
| 3.91 | 56 |
| 3.78 | 13 |
| 3.66 | 50 |
| 3.48 | 62 |
| 3.26 | 25 |
| 3.17 | 100 |
| 3.07 | 50 |
| 3.02 | 38 |
| 2.91 | 62 |
| 2.65 | 44 |
| 2.62 | 31 |
| 2.53 | 25 |
| 2.45 | 19 |
| 2.42 | 25 |
| 2.19 | 25 |

9. A synthetic, crystalline zeolite according to claim 4, wherein at least a substantial portion of the exchangeable cations are calcium ions as shown in the following table

| d (Å.): | CaL |
|---|---|
| 15.8 | 100 |
| 7.89 | 10 |
| 7.49 | 31 |
| 5.98 | 33 |
| 5.75 | 18 |
| 4.57 | 37 |
| 4.39 | 16 |
| 4.33 | 29 |
| 3.91 | 33 |
| 3.78 | 12 |
| 3.66 | 22 |
| 3.48 | 22 |
| 3.26 | 22 |
| 3.17 | 47 |
| 3.07 | 22 |
| 3.02 | 10 |
| 2.91 | 31 |

10. A synthetic, crystalline zeolite according to claim 4, wherein at least a substantial portion of the exchangeable cations are cerium ions and the X-ray powder diffraction pattern is essentially as shown in the following table

| d (Å.): | Ce₂L |
|---|---|
| 15.8 | 100 |
| 7.89 | 38 |
| 7.49 | 94 |
| 5.98 | 94 |
| 5.75 | — |
| 4.57 | 75 |
| 4.39 | 63 |
| 4.33 | 69 |
| 3.91 | 81 |
| 3.78 | 38 |
| 3.66 | 56 |
| 3.48 | 50 |
| 3.26 | 25 |
| 3.17 | 88 |
| 3.07 | 63 |
| 3.02 | 25 |
| 2.91 | 81 |
| 2.65 | 69 |
| 2.62 | 38 |
| 2.53 | 38 |
| 2.45 | 44 |
| 2.42 | 25 |
| 2.19 | 56 |

11. A synthetic, crystalline zeolite according to claim 4, wherein at least a substantial portion of the exchangeable cations are magnesium ions and the X-ray powder diffraction pattern is essentially as shown in the following table

| d (Å.): | MgL |
|---|---|
| 15.8 | 100 |
| 7.89 | 12 |
| 7.49 | 24 |
| 5.98 | 29 |
| 5.75 | 16 |
| 4.57 | 33 |
| 4.39 | 12 |
| 4.33 | 22 |
| 3.91 | 39 |
| 3.78 | 14 |
| 3.66 | 20 |
| 3.48 | 24 |
| 3.26 | 20 |
| 3.17 | 51 |
| 3.07 | 29 |
| 3.02 | 12 |
| 2.91 | 29 |
| 2.65 | 22 |
| 2.62 | 14 |
| 2.53 | 6 |
| 2.45 | 6 |
| 2.42 | 10 |
| 2.19 | 12 |

12. A synthetic, crystalline zeolite having a composition, expressed in terms of moles of oxides, as follows:

$$0.9\text{--}1.3[(1-x)K_2O, xNa_2O]:Al_2O_3:5.2\text{--}6.9SiO_2:yH_2O$$

wherein "$x$" is any value from 0 to about 0.75 and "$y$" is any value from 0 to about 9, said synthetic, crystalline zeolite having an X-ray powder diffraction pattern essentially the same as that shown in Table B.

13. A process for preparing a potassium-sodium aluminosilicate crystalline zeolite having an X-ray powder diffraction pattern essentially the same as that shown in Table B, which process comprises preparing an aqueous metal aluminosilicate mixture whose composition, expressed in terms of mole ratios of oxides, falls within the following ranges:

| | |
|---|---|
| $K_2O/(K_2O+Na_2O)$ | From about 0.33 to about 1 |
| $(K_2O+Na_2O)/SiO_2$ | From about 0.35 to about 0.5 |
| $SiO_2/Al_2O_3$ | From about 10 to about 28 |
| $H_2O/(K_2O+Na_2O)$ | From about 15 to about 41 | and maintaining such mixture at a temperature of between about 100° C. and 150° C. until the desired crystalline zeolite product is formed.

14. A process for preparing a potassium-sodium aluminosilicate crystalline zeolite having an X-ray powder diffraction pattern essentially the same as that shown in Table B, which process comprises preparing an aqueous metal aluminosilicate mixture whose composition, expressed in terms of mole ratios of oxides, falls within the following ranges:

$K_2O/(K_2O+Na_2O)$ ------ From about 0.33 to about 1
$(K_2O+Na_2O)/SiO_2$ ------ From about 0.35 to about 0.5
$SiO_2/Al_2O_3$ -------------- From about 10 to about 28
$H_2O/(K_2O+Na_2O)$ -------- From about 15 to about 41 maintaining such mixture at a temperature of approximately 100° C. until the desired crystalline zeolite product is formed and separating the resulting crystals from the reactant mother liquor.

15. A dehydrated synthetic crystalline zeolite having a composition, expressed in terms of moles of oxides, as follows:

$$0.9\text{-}1.3\frac{M}{n}_2O:Al_2O_3:5.2\text{-}6.9SiO_2$$

wherein "M" represents at least one exchangeable cation selected from the group consisting of metal ions of Groups I, II and III of the Periodic Table, hydrogen ions and ammonium ions, and "$n$" represents the valence of "M," said dehydrated synthetic crystalline zeolite having an X-ray powder diffraction pattern essentially the same as that shown in Table B.

16. A synthetic, crystalline zeolite having a composition, expressed in terms of moles of oxides, as follows:

$$1.0\pm0.1\frac{M}{n}_2O:Al_2O_3:6.4\pm0.5SiO_2:yH_2O$$

wherein "M" represents at least one exchangeable cation, "$n$" represents the valence of "M" and "$y$" is any value from 0 to about 7, said synthetic, crystalline zeolite having an X-ray powder diffraction pattern essentially the same as that shown in Table B.

17. A process for preparing a potassium-sodium aluminosilicate crystalline zeolite having an X-ray powder diffraction pattern essentially the same as that shown in Table B, which process comprises preparing an aqueous metal aluminosilicate mixture whose composition, expressed in terms of mole ratios of oxides, falls within the following ranges:

$K_2O/(K_2O+Na_2O)$ ------ From about 0.33 to about 1
$(K_2O+Na_2O)/SiO_2$ ------ From about 0.4 to about 0.5
$SiO_2/Al_2O_3$ -------------- From about 15 to about 28
$H_2O/(K_2O+Na_2O)$ -------- From about 15 to about 41 and maintaining such mixture at a temperature of between about 100° C. and 120° C. until the desired crystalline zeolite product is formed.

18. A dehydrated synthetic crystalline zeolite having a composition, expressed in terms of mole ratios of oxides, as follows:

$$1.0\pm0.1\frac{M}{n}_2O:Al_2O_3:6.4\pm0.5SiO_2$$

wherein "M" represents at least one exchangeable cation selected from the group consisting of metal ions of Groups I, II and III of the Periodic Table, hydrogen ions and ammonium ions, and "$n$" represents the valence of "M," said dehydrated synthetic crystalline zeolite having an X-ray powder diffraction pattern essentially the same as that shown in the following table:

| $d$ (A.) |
|---|
| 16.1 ±0.3 |
| 7.52±0.04 |
| 6.00±0.04 |
| 4.57±0.04 |
| 4.35±0.04 |
| 3.91±0.02 |
| 3.47±0.02 |
| 3.28±0.01 |
| 3.17±0.01 |
| 3.07±0.01 |
| 2.91±0.01 |
| 2.65±0.01 |
| 2.46±0.01 |
| 2.42±0.01 |
| 2.19±0.01 |

References Cited by the Examiner

UNITED STATES PATENTS

| 2,882,244 | 4/59 | Milton | 23—113 |
| 2,950,952 | 8/60 | Breck et al. | 23—113 |
| 3,012,853 | 12/61 | Milton | 23—113 |

OTHER REFERENCES

Mellor: Comprehensive Treatise in Inorganic and Theoretical Chemistry, volume 6, pages 567–568, 576–579, Longmans, Green & Co., N.Y., 1925.

MAURICE A. BRINDISI, *Primary Examiner.*

UNITED STATES PATENT OFFICE
CERTIFICATE OF CORRECTION

Patent No. 3,216,789                            November 9, 1965

Donald W. Breck et al.

It is hereby certified that error appears in the above numbered patent requiring correction and that the said Letters Patent should read as corrected below.

Column 14, line 5, for "$Ce_2L$" read -- $Ce_2L_3$ --; same column 14, line 75, column 15, line 15 and column 16, line 6, after "$Na_2O$", each occurrence, insert a closing parenthesis.

Signed and sealed this 16th day of August 1966.

(SEAL)
Attest:

ERNEST W. SWIDER                            EDWARD J. BRENNER
Attesting Officer                                Commissioner of Patents